United States Patent
Whitehead et al.

(10) Patent No.: US 8,242,455 B2
(45) Date of Patent: Aug. 14, 2012

(54) ROBUST RADIATION DETECTOR COMPRISING DIAMOND

(75) Inventors: Andrew John Whitehead, Surrey (GB); Christopher John Wort, Oxfordshire (GB); Kevin John Oliver, Dorchester (GB)

(73) Assignee: Diamond Detectors Limited, Dorset (GB)

( * ) Notice: Subject to any disclaimer, the term of this patent is extended or adjusted under 35 U.S.C. 154(b) by 160 days.

(21) Appl. No.: 12/513,814

(22) PCT Filed: Nov. 12, 2007

(86) PCT No.: PCT/IB2007/054583
§ 371 (c)(1),
(2), (4) Date: Jul. 23, 2009

(87) PCT Pub. No.: WO2008/059428
PCT Pub. Date: May 22, 2008

(65) Prior Publication Data
US 2010/0155615 A1    Jun. 24, 2010

(30) Foreign Application Priority Data
Nov. 14, 2006 (GB) .................. 0622695.5

(51) Int. Cl.
*G01T 1/24* (2006.01)
(52) U.S. Cl. ............... 250/370.14; 257/E21.214
(58) Field of Classification Search ........... 250/370.01, 250/370.11, 370.1, 370.14, 396 R; 257/E21.214; 438/56
See application file for complete search history.

(56) References Cited

U.S. PATENT DOCUMENTS
5,212,385 A * 5/1993 Jones .................. 250/370.01
(Continued)

FOREIGN PATENT DOCUMENTS
EP    0 474 385 A2    3/1992
(Continued)

OTHER PUBLICATIONS
International Search Report for PCT/IB2007/054583 dated Oct. 17, 2008.
(Continued)

*Primary Examiner* — David Porta
*Assistant Examiner* — Faye Boosalis
(74) *Attorney, Agent, or Firm* — Bryan Cave LLP (57) ABSTRACT

A radiation detector comprises a substrate of diamond material and at least one electrode formed at a surface of the substrate. The electrode comprises electrically conductive material deposited in a cavity in the surface of the substrate so that at least a portion of the material of the electrode is below the surface of the substrate. The cavity will typically be an elongate trench or channel in which electrically conductive material such as boron-doped diamond is deposited. In some embodiments, at least two electrodes are located adjacent to one another at the surface of the substrate. In other embodiments, the device has a plurality of electrodes, at least one of which is located at a first surface and at least one of which is located at an opposed second surface of the substrate. In the latter case, an electrode at one surface of the substrate can be connected to an electrode at the opposed surface of the substrate by means of a conductive via, which consists of a through-hole filled or coated with conductive material. Typically, the electrodes are arranged in an interdigitated configuration, each electrode having a plurality of elongate electrode elements. Each such electrode element extends parallel to at least one adjacent electrode element of another electrode.

19 Claims, 2 Drawing Sheets

U.S. PATENT DOCUMENTS

| | | | |
|---|---|---|---|
| 5,757,007 A | 5/1998 | Sangsingkeow | |
| 6,043,495 A * | 3/2000 | Verger et al. | 250/370.01 |
| 6,072,181 A * | 6/2000 | Hassard et al. | 250/370.01 |
| 6,429,436 B1 | 8/2002 | Tomisaki et al. | |
| 7,692,156 B1 * | 4/2010 | Nagarkar | 250/370.11 |
| 2005/0116174 A1 * | 6/2005 | Berdermann et al. | 250/370.01 |
| 2009/0114839 A1 * | 5/2009 | LeChevalier | 250/396 R |
| 2009/0302231 A1 * | 12/2009 | McGregor et al. | 250/390.03 |
| 2010/0219350 A1 * | 9/2010 | Kobashi et al. | 250/370.1 |

FOREIGN PATENT DOCUMENTS

| | | |
|---|---|---|
| GB | 2 404 780 A | 2/2005 |
| WO | 96 04572 A1 | 2/1996 |
| WO | 01 69285 A1 | 9/2001 |
| WO | 01 96633 A1 | 12/2001 |
| WO | 01 96634 A1 | 12/2001 |
| WO | 2004 023160 A1 | 3/2004 |

OTHER PUBLICATIONS

Jiang et al., "Conceptual Development and Characterization of a Diamond-Based Ultraviolet Detector," Review of Scientific Instruments, Feb. 1, 1999, 1333-1340, vol. 70, No. 2.

* cited by examiner

ROBUST RADIATION DETECTOR COMPRISING DIAMOND

CROSS-REFERENCE TO RELATED APPLICATIONS

This application was filed under 35 U.S.C. §371 as a National Stage application of PCT International Application Serial No. PCT/IB2007/054583, filed Nov. 12, 2007. PCT International Application Serial No. PCT/IB2007/054583 claims priority to UK Patent Application GB 0 622 695.5, filed Nov. 14, 2006, which is incorporated herein by reference in its entirety.

BACKGROUND OF THE INVENTION

THIS invention relates to a radiation detector comprising diamond material and to a method of manufacturing the radiation detector.

Semiconductors can be configured to make solid-state ionisation chambers for detecting ionising radiation through the generation of electron-hole pairs within the semiconducting material. Provided the material is sufficiently free from electronic traps, the charge generated by the ionising radiation can be swept (through the application of an electric field) to suitable electrical electrodes and then measured by an appropriate external electronic circuit. Although silicon is the current material of choice for many such detectors, there are alternative materials available. Diamond is a wide band-gap semiconductor and can be configured to make a radiation detector. Diamond-based radiation detectors have been reported in the literature, for example WO2004023160. However, there is a requirement for a very robust radiation detector for environments that are hostile in the sense of the physical environment and the radiation environment, which is a requirement that has not been adequately addressed.

Solid-state ionisation chambers based upon silicon, currently used for the detection and monitoring of alpha and beta particles (or radiation) in particular, are not sufficiently robust enough for use in environments such as nuclear installations. In addition, silicon-based detectors are sensitive not only to temperature, and thus require compensation electronics, but also to light in the visible spectrum and therefore require an opaque coating on the outermost surface, which must be thin enough to still allow the alpha and beta particles to pass through. Such detectors are used in the decommissioning as well as in the day to day running of nuclear power plants and the environments are thus often dusty and erosive.

In such circumstances, the detectors are frequently damaged during the cleaning of the outermost surface, either by scratching through the thin opaque outer coating (thus rendering the detector susceptible to light) or by damaging the delicate device structure itself. As such detectors are often part of safety systems, the risk of false alarms caused by light reaching the detector element or the possibility of total failure of the device due to damage during routine cleaning are important considerations.

It is an object of the invention to provide a relatively robust and hence more reliable detector.

SUMMARY OF THE INVENTION

According to the invention there is provided a radiation detector comprising a substrate of diamond material and at least one electrode formed at least one surface of the substrate, the electrode comprising electrically conductive material deposited in a cavity in the surface of the substrate so that at least a portion of the material of the electrode is below the surface of the substrate.

The radiation detector may comprise at least two electrodes located adjacent to one another at a surface of the substrate.

Alternatively, the radiation detector may comprise a plurality of electrodes at least one of which is located at a first surface and at least one of which is located at an opposed second surface of the substrate.

In the latter case, an electrode at one surface of the substrate may be connected to an electrode at the opposed surface of the substrate by means of a conductive via or vias.

A plurality of electrodes may be arranged in an interdigitated configuration, each electrode having a plurality of elongate electrode elements, and each electrode element extending parallel to at least one adjacent electrode element of another electrode.

In one embodiment, adjacent electrode elements may extend into the substrate to a depth which is comparable to or larger than the spacing between adjacent electrode elements, so that adjacent electrode elements overlap in a direction normal to a surface of the substrate.

Preferably, the electrode elements have a depth, in a direction normal to said surface of the substrate, which is at least 50% of the thickness of the substrate.

The cavity in which the electrically conductive material of each electrode is deposited may be formed as an elongate trench or channel.

The electrically conductive material deposited in the cavity may comprise a doped diamond material which is electrically conductive.

For example, the electrode material may comprise boron-doped diamond.

The dopant concentration in the electrode material is preferably greater than $5 \times 10^{19}$ atoms per cm$^3$.

The electrode material may comprise a metal such as boron, or a carbide forming metal such as W, Mo, Ti or Cr.

The radiation detector may further include an ohmic external contact applied to said at least one electrode formed in the substrate, to allow connection of the radiation detector to an electronic measurement circuit.

The radiation detector may include one or more connections or vias of conductive material extending through the substrate between a first surface of the substrate and an opposed second surface of the substrate.

The radiation detector may have a detector structure formed at the first surface of the substrate, said one or more connections or vias being provided to define contacts on the opposed second surface of the substrate by means of which electrical connections can be made to the detector structure.

The connections or vias may interconnect respective common contact zones of detector structures formed at the opposed surfaces of the substrate.

The connections or vias are preferably arranged to permit a detector bias voltage to be applied to, and permit an electrical output signal to be obtained from, contacts on the opposed second surface that are electrically connected to a detector structure on the first surface.

Each connection or via may comprise a through-hole extending between the opposed first and second substrate surfaces in a direction substantially normal to the substrate surfaces, the internal surface of the through-hole being coated with, or the volume of the through-hole being at least partially filled by, conductive material.

The conductive material used to coat or fill the through-hole is preferably the same conductive material used to form the electrodes.

The through-hole of each connector or via preferably has a width-to-depth ratio between 0.5 and 10 so that the internal surface of the through-hole may be coated or at least partially filled with conductive material.

The radiation detector may include respective first and second interdigitated electrode arrays formed on both the first and second surfaces of the substrate so as to form a double sided detector, the electrode arrays being connected by the connections or vias.

Further according to the invention there is provided a method of manufacturing a radiation detector, the method comprising providing a substrate of diamond material, forming at least one cavity in a first surface of the substrate, and depositing electrically conductive material in the cavity to form an electrode at the first surface of the substrate, so that at least a portion of the material forming the electrode is below the first surface of the substrate.

The method may include preparing at least a portion of the surfaces of the cavity in which the electrodes are formed to minimise the density of surface and near-surface electronic states.

The method may include controlling the physical properties and structure of the surface and the termination of the surface to minimise the density of surface and near-surface electronic states.

The method may further include controlling the subsurface damage of the surface to minimise the density of surface and near-surface electronic states.

The method may include forming at least two electrodes adjacent one another at the first surface of the substrate.

The method may comprise forming a plurality of electrodes in an interdigitated configuration, each electrode having a plurality of elongate electrode elements, and each electrode element extending parallel to at least one adjacent electrode element of another electrical electrode.

The method may comprise forming the cavity in which the electrically conductive material of the electrode is deposited as an elongate trench or channel.

The method may include forming the cavity by a laser cutting process.

The laser-cut trenches or channels may be subjected to further processing by ion beam etching, reactive ion etching or plasma etching to ensure that the surfaces of the trenches or channels are substantially free from damage.

The method may include the step of polishing the first surface of the substrate after deposition of the electrically conductive material, resulting in a surface which comprises co-planar diamond substrate and electrode surfaces.

The method may include forming ohmic external contacts to the electrodes formed in the substrate, to allow connection of the radiation detector to an electronic measurement circuit.

The method may include forming one or more connections or vias comprising conductive material between the first surface of the substrate and an opposed second surface of the substrate.

Said one or more connections or vias may be formed by laser cutting at least one through-hole between the opposed first and second substrate surfaces in a direction substantially perpendicular to the substrate surfaces, and coating the internal surface of the through-hole, or filling the volume of the through-hole at least partially, with conductive material.

Preferably, the through-hole of each connector or via is formed with a width-to-depth ratio between 0.5 and 10 so that the internal surface of the through-hole may be coated or at least partially filled with conductive material.

The method may include forming the through-hole of each connector or via with a width-to-depth ratio or diameter-to-depth ratio which is within 50% of that of the trenches or cavities of the interdigitated electrode array.

The laser-cut through-holes may be subjected to further processing by ion beam etching, reactive ion etching or plasma etching to ensure that the surfaces of the through-holes are substantially free from damage.

The method may include coating or filling the through-holes with the same conductive material used to define said at least one electrode at the surface of the substrate.

The radiation detector of the invention may be used to detect any ionising radiation including alpha particles, beta particles, relativistic heavy ions, pions and x-rays.

DESCRIPTION OF PREFERRED EMBODIMENTS

It is well known that CVD diamond can be used to detect ionising radiation (e.g. photons with energy >5.5 eV, alpha particles, beta particles, etc) through the generation of electron-hole pairs provided the diamond material has a sufficiently low number of electronic traps. What is less well known is that polishing diamond introduces sub-surface damage that can trap charge carriers below the surface. It is also not generally understood that this sub-surface damage can prevent some or even any charge generated by the ionising radiation from reaching electrodes on the diamond material, thus lowering the detector sensitivity and possibly suppressing detection entirely.

The majority of detectors reported to date rely on a simple metal electrode on the diamond surface, which can be a planar metallic pad or an interdigitated electrode structure. Either type of electrode is still affected by the sub-surface damage introduced by the diamond polishing process which is usually required to allow the electrode to be formed on the surface in the first place. Detectors have been realised by forming an electrode or electrical contact directly on the "as-grown" diamond surface. However, these have the added disadvantage in that the outermost surface is also rough (thus easily contaminated and harder to clean) as well as having a delicate metallic surface open to the hostile environment.

The present invention avoids this problem by forming electrodes which are below the general level of the surface of the substrate and therefore are not subject to the above issues. The substrate can be polished before the electrodes are formed. Alternatively, once the electrodes have been formed below the general level of the surface of the substrate, the substrate surface can be polished without damaging the electrodes.

Figure 1:
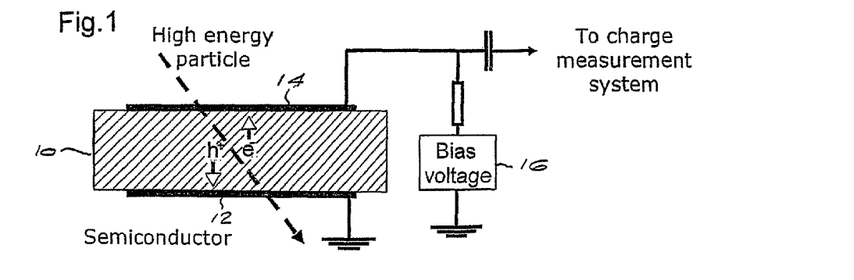
FIG. 1 is a simplified schematic diagram showing the general arrangement of a known radiation detector utilising semiconductor material.

FIG. 1 shows, in a highly simplified schematic form, the arrangement of a radiation detector employing a semiconductor detector element 10. The detector element has electrodes 12 and 14 which are connected to a bias voltage source 16 and to a charge measurement system. The detector operates as a solid-state ionisation chamber, releasing holes or electrons when a high energy particle or photon passes through the detector element. Small current pulses due to this phenomenon are detected and indicated by the measurement system.

Figure 2:
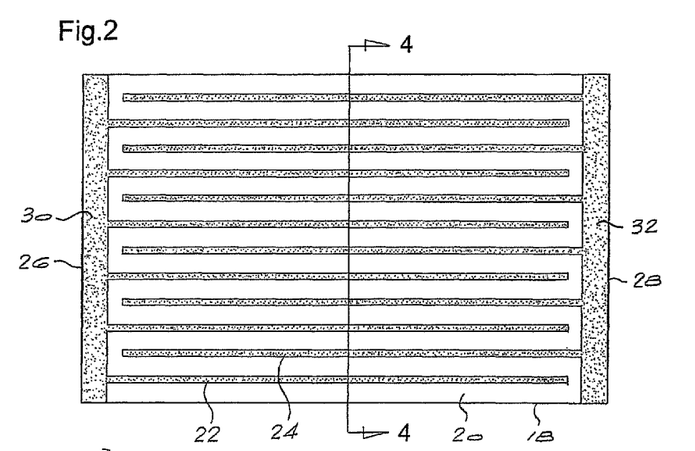
FIG. 2 is a schematic plan view (not to scale) of an interdigitated electrode structure of a radiation detector according to the invention.
Figure 3:
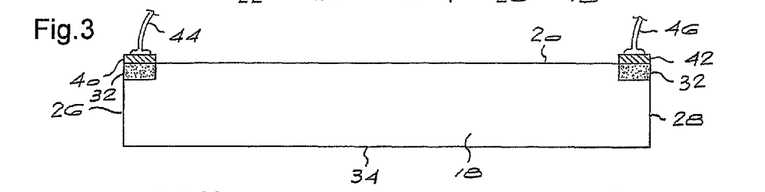
FIG. 3 is a side view of the radiation detector of FIG. 2.
Figure 4:
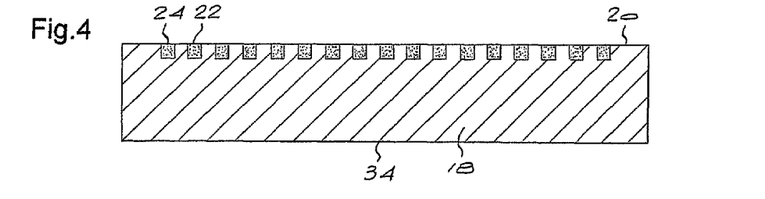
FIG. 4 is a section on the line 4-4 in FIG. 2.

FIGS. 2 to 4 show, in a highly simplified schematic form (not to scale), a robust, diamond-based radiation detector of the present invention. The detector comprises a substrate 18 of diamond material which can comprise polycrystalline diamond or single crystal diamond. In the case of polycrystalline diamond material, the substrate should be of electronic quality, that is, having either a charge collection distance at an applied electric field of 1 V/μm of greater than the anode-cathode spacing of the interdigitated electrode or a charge collection distance at an applied electric field of 1 V/μm of greater than 50 μm. Such material typically has a large grain size and a low density of point defects, such as single substitutional nitrogen, that act as charge trapping and recombination centres.

In the case of single crystal diamond material, it should preferably be made by the method disclosed in either WO 01/96634 or WO 01/96633, the contents of which are incorporated herein by reference, and thus should have good electronic properties. In either case, the diamond substrate should be formed by chemical vapour deposition (CVD) techniques. The diamond of the substrate is also referred to as being 'intrinsic diamond'.

In the embodiment where there is an interdigitated electrode on only one side of the substrate, the substrate should be chosen to have a thickness that is preferably at least 50 μm thicker, more preferably at least 100 μm thicker, still more preferably at least 200 μm thicker, and most preferably at least 300 μm thicker than the depth chosen for the deeper of the trenches for the common contact zones of the device (see below) and the trenches for the electrodes.

In the embodiment where the detector has interdigitated electrodes on both opposed major surfaces, the substrate should be chosen to have a thickness that is preferably at least 50 μm thicker, more preferably at least 100 μm thicker, still more preferably at least 200 μm thicker, and most preferably at least 300 μm thicker than twice the depth chosen for the deeper of the trenches for the common contact zones and the trenches for the electrodes.

A first major surface 20 of the substrate is initially processed by lapping or lapping and polishing to an acceptable degree of smoothness. The degree of smoothness required is such that when laser cutting the trenches for the electrodes, the laser path is stable and does not 'wander about' on the surface and the base of the trenches is sufficiently smooth. The root mean square roughness ($R_q$) of the surface after processing is preferably less than 500 nm, more preferably less than 200 nm, still more preferably less than 100 nm, still more preferably less than 80 nm, still more preferably less than 50 nm, still more preferably less than 30 nm, still more preferably less than 20 nm, and most preferably less than 10 nm.

Alternatively the surface can be processed by techniques such ion beam milling, reactive ion etching, or laser ablation either from the as grown state or after lapping or after lapping and polishing. The root mean square roughness ($R_q$) of the surface after such processing is preferably less than 500 nm, more preferably less than 200 nm, still more preferably less than 100 nm, still more preferably less than 80 nm, still more preferably less than 50 nm, still more preferably less than 30 nm, still more preferably less than 20 nm, and most preferably less than 10 nm.

To provide the locations for the electrodes 22 and 24 below the general level of the surface of the substrate 20, a series of elongate trenches are cut into the substrate surface by laser cutting or laser milling or reactive ion etching or ion beam milling. In a first embodiment of the invention, the trenches extend parallel to one another and preferably have a depth between 10 and 100 μm and a width of between 10 and 100 μm. Adjacent trenches are separated by a distance of 20 to 100 μm, typically about 30 to 80 μm. The trenches are generally rectangular in cross section, typically slightly narrower in width at the bottom of the trench than at the top, with a width to depth ratio (that is width÷depth) of preferably between 0.5 and 10.0, more preferably between 0.6 and 5.0, still more preferably between 0.7 and 3.0, and most preferably between 0.8 and 2.0. If the trenches are to be in-filled with boron-doped diamond, then the preferred width to depth ratio is between 2.0 and 10.0.

At opposed ends 26 and 28 of the substrate, transversely extending trenches are cut to provide the locations for common contact zones 30 and 32, to which all the respective elongate contact elements 22 and 24 are connected. The common contact zones 30 and 32 can be used to form external electrical contacts to the detector. The trenches for the common contact zones are generally rectangular in cross section, with a width to depth ratio of preferably between 0.5 and 10.0, more preferably between 0.6 and 5.0, still more preferably between 0.7 and 3.0, and most preferably between 0.8 and 2.0. If the trenches are to be in-filled with boron-doped diamond, then the preferred width to depth ratio is between 2.0 and 10.0.

The trenches for the common contact zones may be along edges of the detector or adjacent to the edges of the detectors, or located elsewhere in on the surface of the detector. The common contact zones may be parallel to one or more edges of the detector, but not necessarily.

Instead of laser cutting or milling, other methods can be used to form the trenches. For example, ion beam etching, plasma etching, reactive ion etching, etc. or a combination of these techniques can be used to form the trenches. In a preferred version of the method, laser cutting is used to form the trenches initially and a second stage treatment using ion beam etching, reactive ion etching or plasma etching is applied to ensure that the surfaces of the trenches are substantially free from damage.

According to an aspect of the invention, described with reference to FIGS. 5 and 6, one or more through holes or vias can be formed to connect the front surface 20 and an opposed second, back surface 34 of the substrate 18. This is preferably accomplished using laser cutting or laser drilling. In the embodiment shown in FIGS. 5 and 6, first and second vias 36 and 38 are provided, which interconnect respective common contact zones 30 and 32 on the front and back surfaces of the substrate.

The vias are typically holes with a circular cross section and are cylindrical or slightly tapered. The range of suitable diameter to depth ratios of the vias is broadly similar to that of the trenches made for the electrodes and common contact zones. The diameter to depth ratio of the vias is preferably between 0.5 and 10.0, more preferably between 0.6 and 5.0, still more preferably between 0.7 and 3.0, and most preferably between 0.8 and 2.0. If vias are to be present, the trenches prepared for the common contact zones should terminate at the vias. If the vias are to be in-filled with boron-doped diamond, then the preferred diameter to depth ratio is between 2.0 and 10.0.

The vias can be provided to inter-connect common contact zones on opposed front and back surfaces of the detector, as described above, but can also be provided on a single-sided detector. This permits electrical contacts to be made to the back surface of the detector, which is desirable in achieving a smooth, robust detector surface.

The aspect ratio (i.e. the ratio of the width to the depth) of the trenches for the common contact zones should be chosen so that it is compatible with the technique used for providing the conductive contacts. Those skilled in the art will be aware that different coating techniques have different 'throwing powers', that is abilities to coat down narrow holes or around corners. With a technique with only a moderate throwing power, such as CVD diamond deposition or sputtering, it is better to use high as an aspect ratio as possible. If the technique to be used has a higher throwing power, such as electroless-nickel plating, then a lower aspect ratio can be chosen.

After the trenches/through-holes for the electrodes, common contact zones and optional vias have been fabricated in the substrate, the substrate should be cleaned to remove any debris, particularly graphitic debris, resulting from the laser cutting. Typically this is done using methods known in the art such as using hot concentrated sulphuric acid and potassium nitrate.

According to an aspect of the invention, after initial formation of the necessary through-holes by laser cutting or drilling, the internal surfaces of the vias can be subjected to a second stage treatment using ion beam etching, reactive ion etching or plasma etching to ensure that the surfaces of the through-holes are substantially free from damage.

The laser cut sides of the trenches/through-holes have no significant sub-surface damage (i.e. no electronic traps) and thus any carriers generated by impinging ionising radiation can easily be swept through to the interdigitated contacts by an electrical field applied via the contacts in use (typically 0.2 to 5.0 V/μm).

The trenches and vias (if present) are now filled or partially filled with an electrically conductive material to define the interdigitated electrodes themselves. Preferably, electrically conducting boron-doped diamond is used to form the electrodes. The boron concentration of the boron-doped diamond is preferably greater than $5 \times 10^{19}$ atoms per cm$^3$, more preferably greater than $1 \times 10^{20}$ atoms per cm$^3$, and most preferably greater than $5 \times 10^{20}$ atoms per cm$^3$. In the case of boron-doped diamond, a boron dopant concentration above $5 \times 10^{20}$ atoms per cm$^3$ provides true metallic conduction properties. Where the electrodes are formed of conducting diamond material, there is no significant thermal expansion mismatch between the electrodes and the material of the detector substrate, which would otherwise induce stresses and possibly generate electronic traps. In addition, the interface between the electrodes and the intrinsic substrate material is almost perfect as no intermediate materials, that could affect the electrode efficiency, are present.

In the case of the trenches and vias (where present) being filled with boron-doped diamond, it is preferred that the boron-doped diamond is deposited by a CVD method. The whole substrate is covered with a more-or-less uniform thickness, more-or-less conformal and continuous layer. The thickness of the layer deposited need not be more than the depth of the trenches. In the case of the vias, it is unlikely that they will be completely filled by this step (as they are of necessity deeper than the trenches in which the interdigitated electrodes are prepared. However by choosing their diameter-to-depth ratios appropriately, the whole inner surfaces of the vias will be coated with a layer of conductive boron-doped diamond. The diameter-to-depth ratio is preferably between 0.5 and 10, more preferably between 0.6 and 5, still more preferably between 0.7 and 3, and most preferably between 0.8 and 2. Preferably the diameter-to-depth or width-to-depth ratio of the through-holes of the vias is similar to and within 50%, preferably within 30%, more preferably within 20% and most preferably within 10% of that of the trenches or cavities.

Alternatively, by choosing an appropriate aspect ratio, the via or vias may be partially filled during the boron-doped diamond deposition process and the remaining space may be filled with a metal or other conductive material.

In the embodiment where there are interdigitated electrode arrays on both surfaces of the substrate, it will be obvious to those skilled in the art that a second stage of deposition of boron-doped diamond will be required to in-fill the trenches on the second surface. It may however not be apparent to those skilled in the art that the first surface to be in-filled must be processed back as described below before the second surface can be in-filled.

After the trenches are in-filled or partially in-filled with boron-doped diamond, the surface must be processed to re-expose the diamond of the substrate in those areas where neither trenches nor vias were previously formed. In order to process accurately, it is necessary to have a reference plane against which the amount of material removed can be measured. It is for this reason that the in-filling must be carried out in two stages.

Conventional techniques of lapping or lapping and polishing can be used for processing back the overgrown boron-doped diamond to the level of the original substrate surface. In the case of the substrate being a single crystal CVD diamond, it may be advantageous to use the technique of scaif polishing.

The root mean square roughness ($R_q$) of the surface after such processing is preferably less than 500 nm, more preferably less than 200 nm, still more preferably less than 100 nm, still more preferably less than 80 nm, still more preferably less than 50 nm, still more preferably less than 30 nm, still more preferably less than 20 nm, and most preferably less than 10 nm.

After the surface has been processed, the anode and cathode of the boron-doped diamond interdigitated electrodes are electrically isolated from each other.

In order to complete the second side of a double sided detector, the above process is repeated.

In alternative embodiments, the electrodes can be formed from selected metals or other semiconductors, and can be optimised for specific applications. In an alternative embodiment the trenches could be filled, for example, with a carbide forming metal (W, Mo, Ti or Cr etc) or boron of natural isotopic abundance, or isotopically enriched $^{10}$B, or mildly enriched $^{235}$U, depending upon which type of radiation is to be detected.

The "mark-space" ratio of the electrodes to the open areas of the detector surface, that is, the ratio of the width of an electrode to the width of the gap between two adjacent electrodes (width of an electrode÷width of the gap between two adjacent electrodes), can be optimised for each specific application.

The mark-space ratio can be the same over the whole surface or surfaces of the detector or can vary. For example, for a detector with a pair of interdigitated electrodes on opposing surfaces, the mark-space ratio might be chosen to be different for the two pairs of interdigitated electrodes In the case of a substrate formed from polycrystalline diamond material, it is significant that the electrode separation (typically about 50 microns) is smaller than the grain size at the surface of the CVD diamond substrate (typically 100 to 200 microns) so that grain boundaries do not affect the detector sensitivity. Thus, the device performs in a similar manner to a single crystal detector, but has the advantage of a larger possible detector area.

As shown schematically in FIG. 3, true ohmic external contacts 40 and 42 (having essentially zero activation energy at room temperature or above) are formed onto the common contact zones 30 and 32 of the electrically conducting boron-doped diamond contacts via the use of a metallic carbide interface material (Ti, Cr, Mo, W, etc.) to allow electrical connections 44 and 46 to be made to the detector. True ohmic contacts are formed onto metallic contact zones when a carbide forming metal is used for the contact material rather than boron-doped diamond.

Figure 5:
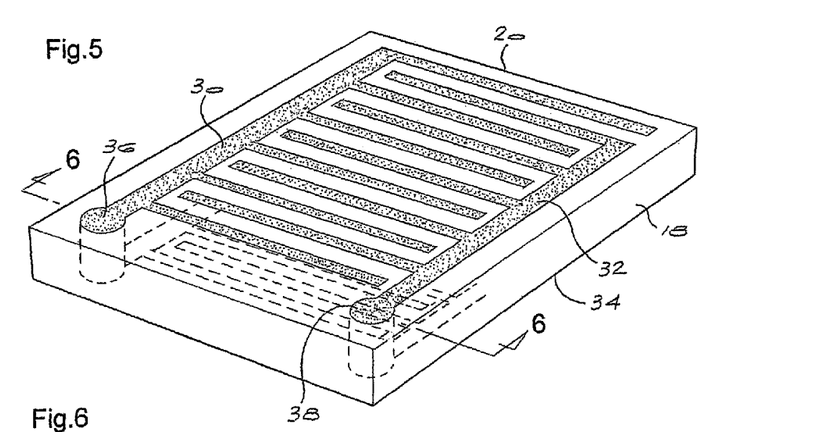
FIG. 5 is a simplified schematic diagram (not to scale) showing an alternative embodiment of a radiation detector according to the invention.
Figure 6:
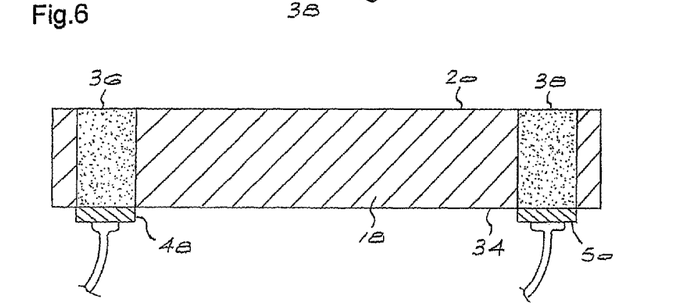
FIG. 6 is a section on the line 6-6 in FIG. 5.

In the case where there are vias connecting the front and back surfaces of the detector, as in the embodiment of FIGS. 5 and 6, true ohmic external contacts 48 and 50 are formed on the in-filled end surfaces of the vias 36 and 38 on the back surface 34 of the substrate, thereby providing a detector in which the front surface 20 (which is exposed to the environment) has no parts which are not robust and the connection to the external measurement system is made from the back surface (which is or can be protected from the environment).

Processes by which ohmic contacts can be applied are known in the art. One process which is widely used is to deposit a thin (0.1-5 nm) layer of titanium on the required area using a sputtering technique followed by a 0.1-1 μm thick layer of gold, also by a sputtering technique. After the deposition of the contacts, the detector with the contacts is annealed in vacuum at 400-500° C. for a few minutes (often between 1 and 5 minutes). These ohmic contacts enable the detector to be connected to an external electronic measurement circuit of the kind used with conventional silicon radiation detectors.

Another process known in the art for forming ohmic contacts on diamond uses a platinum layer deposited by a sputtering technique with a thickness of between about 1 nm and 100 nm between the titanium and gold layers.

Another process known in the art uses a chromium layer with a thickness of about 0.1-5 nm instead of a titanium layer.

Using boron-doped diamond or boron metal has the advantage that the electrodes are low Z and tissue equivalent As an all-diamond surface is highly corrosion, erosion and abrasion resistant, the radiation detector of the invention does not need any protective cover in the intended application.

The detector surface is flat and polished, so does not foul easily, and can readily be cleaned without damaging either the electrodes or the detector structure.

The buried interdigitated electrode structure can be used to detect alpha and beta particles, deep UV (energy >5.4 eV) and X-ray radiation.

If the boron in the electrodes is $^{10}$B then slow neutrons can also be detected via the generation of alpha particles, thus:

where Q is the excess energy.

In different embodiments of the invention, the trenches formed in the surface of the substrate are filled with different materials to facilitate the detection of different types of radiation:

To make an alpha particle or beta particle detector, the trenches can be filled with boron-doped diamond or a carbide forming metal such as W, Mo, Ti or Cr, or another metal such as Au, Cu or Pt on top of a thin layer of a carbide forming metal such as W, Mo, Ti or Cr.

To make a neutron detector, the trenches are filled with a material which has a high neutron capture cross section. Examples of suitable material include diamond doped with $^{10}$B, $^{11}$B, $^{235}$U etc.

By forming the electrodes in the diamond detector below the surface of the detector, the comparatively delicate electrodes are protected by the comparatively more robust diamond substrate and are therefore less susceptible to damage by handling or other factors.

The use of shallow trenches, where the depth of the trench is relatively small compared with the lateral spacing between trenches, provides mechanical protection to the contacts, but does not substantially modify the device geometry compared with known devices having electrodes on their surfaces. However, the use of deep trenches, where the depth of the trench is comparable to or larger than the electrode spacing, effectively increases the area of the detector, improving the sensitivity of the device (the signal resulting from a given flux being detected). Thus the overall performance of the device can also be improved by the method of this invention.

Figure 7:
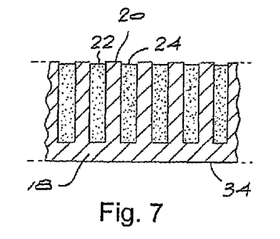
FIGS. 7 & 8 are partial sections, similar to that of FIG. 4, of alternative embodiments of radiation detectors according to the invention having different electrode configurations.
Figure 8:
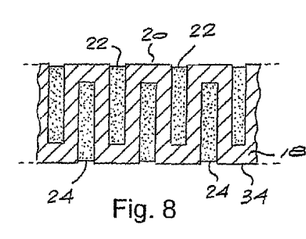

Furthermore, under circumstances where the radiation detector of the invention might otherwise comprise electrodes on opposite faces of a relatively thick substrate in order to obtain sufficient signal from ionising particles passing through the thickness of the material, similar sensitivity can be obtained by putting adjacent and parallel deep trenches of opposing electrodes in an interdigitated format, with the volume of material detecting a given particle path remaining about the same, but the applied electric field now being substantially parallel to the surface of the substrate rather than substantially normal to the surface of the substrate as is found in the conventional design. In such an alternative embodiment, the adjacent deep trenches forming the electrodes 22 and 24 can originate from one surface 20 of the substrate 18, as shown in FIG. 7, or the opposing electrodes can originate from opposite surfaces and overlap in the middle of the thickness of the substrate, as shown in FIG. 8. Essentially, the adjacent electrodes overlap in a direction normal to the surface(s) of the substrate.

In the case of the embodiment of FIG. 8, clearly the depth of the trenches must exceed half the thickness of the substrate if they are to overlap as shown. In both cases, the greater the depth of the trenches, the better. Particularly in the arrangement of FIG. 8, the greater the depth of the trenches, the greater the extent of the overlap will be. The depth of the trenches is preferably at least 50%, more preferably at least 60%, still more preferably at least 70%, and most preferably at least 80% of the thickness of the substrate. In this embodiment the trenches overlap for at least 10%, preferably at least 15%, more preferably at least 20%, still more preferably at least 25%, and most preferably at least 30% of their depth. In this embodiment, the trenches penetrating from opposed surfaces need not be of the same depth.

Not only does this enable the sensitivity normally associated with radiation detectors where the contact structures lie on opposite surfaces to be achieved in devices with contact structures on one surface only, which may be the surface facing away from the harsh environment which the detector needs to characterise, but in addition it can be utilised to improve the radiation hardness of the device by reducing the charge collection distance required in the material (i.e the material can suffer an increased amount of radiation damage before the performance of the detector is significantly affected).

This latter effect to a certain extent results in a trade-off against dark current or noise, in that providing a shorter distance between electrodes of larger surface area which address the same volume of intrinsic diamond results in a higher dark current. However diamond, particularly high-purity diamond, has a very low intrinsic dark current, and a detector fabricated according to the present invention utilising high-purity diamond with deep trenches with well prepared low damage surfaces can still retain a very low dark current. By carefully tailoring the design of the trenches according to the application this invention can provide great benefit in terms of improved radiation hardness without the dark current becoming sufficiently high to impede operation.

This design for a diamond detector structure with improved radiation hardness can also be combined with other detector features, for example with converter layers so that it can be used for detecting thermal neutrons (that is neutrons with energies of about 0.025 eV) by generation of secondary radiation fields. Examples of converter layers include $^{238}$U and $^{10}$B, where the nuclear reactions are and respectively, where $n_{th}$ stands for thermal neutron and FF stands for fission fragment, v is a number typically 2 or 3, and E represent the energy of a gamma-ray emitted during the nuclear reaction.

In this application the fact that the applied field is parallel to the surface of the substrate reduces the sensitivity of the device to the heavy irradiation damage formed by the secondary radiation field in the first few micrometers depth of the diamond layer, whilst still providing adequate signal from the lower level of radiation penetrating further in.

Thus the detector design of this invention provides good mechanical robustness, high sensitivity, and good robustness to radiation damage, and in some respects is easier to fabricate without sub-surface damage being present in the diamond immediately underneath the contacts.

The invention claimed is:

1. A radiation detector comprising a substrate of diamond material and two electrodes, said electrodes being connected to a bias voltage source and a charge measurement system, such that when a high energy particle or photon passes through the detector a current pulse is detected and indicated by the charge measurement system, the substrate comprising at least one surface and at least one cavity in the at least one surface of the substrate, and at least one of the electrodes comprises a deposit of electrically conductive material in the cavity with at least a portion of the electrically conductive material being below the surface of the substrate.

2. A radiation detector according to claim 1 wherein the two electrodes are arranged in an interdigitated configuration, each electrode having a plurality of elongate electrode elements, and each electrode element extending parallel to at least one adjacent electrode element of the other electrode.

3. A radiation detector according to claim 1 wherein the cavity in which the electrically conductive material of each electrode is deposited is formed as an elongate trench or channel.

4. A radiation detector according to claim 1 further including an ohmic external contact applied to at least one electrode formed in the substrate, to allow connection of the radiation detector to an electronic measurement circuit.

5. A radiation detector according to claim 1 including one or more connections or vias of conductive material extending through the substrate between a first surface of the substrate and an opposed second surface of the substrate.

6. A radiation detector according to claim 1 wherein the at least one surface of the substrate is a polished surface, the electrically conductive material in the cavity has an upper surface, and the upper surface of the electrically conductive material is below the polished substrate surface.

7. A method of manufacturing a radiation detector, the method comprising providing a substrate of diamond material, forming at least two cavities, wherein at least one of said cavities is formed in a first surface of the substrate, and depositing electrically conductive material in the cavities to form two electrodes, with at least a portion of the electrically conductive material forming the electrodes being below the first surface of the substrate.

8. A method according to claim 7 including preparing at least a portion of the first surface of the cavity in which the electrodes are formed to minimize the density of surface and near-surface electronic states.

9. A method according to claim 8 including controlling the physical properties and structure of the first surface and the termination of the first surface to minimize the density of surface and near-surface electronic states.

10. A method according to claim 8 including controlling the subsurface damage of the first surface to minimize the density of surface and near-surface electronic states.

11. A method according to claim 7 wherein the two electrodes are formed in an interdigitated configuration, each electrode having a plurality of elongate electrode elements, and each electrode element extending parallel to at least one adjacent electrode element of the other electrical electrode.

12. A method according to claim 11 comprising forming the cavities in which the electrically conductive material of the electrode are deposited as elongate trenches or channels.

13. A method according to claim 12 including forming the cavities by a laser cutting process.

14. A method according to claim 7 including the step of polishing the first surface of the substrate after deposition of the electrically conductive material, resulting in a surface which comprises co-planar diamond substrate and electrode surfaces.

15. A method according to claim 7 including forming ohmic external contacts to the electrodes formed in the substrate, to allow connection of the radiation detector to an electronic measurement circuit.

16. A method according to claim 7 including forming one or more connections or vias comprising conductive material between the first surface of the substrate and an opposed second surface of the substrate.

17. A method according to claim 16 including forming said one or more connections or vias by laser cutting at least one trench, channel, or through-hole between the opposed first and second substrate surfaces in a direction substantially perpendicular to the substrate surfaces, and coating the internal surface of the trench, channel, or through-hole, or filling the volume of the trench, channel, or through-hole at least partially, with conductive material.

18. A method according to claim 17 including subjecting the laser-cut trenches, channels, or through-holes to further processing by ion beam etching, reactive ion etching or plasma etching to ensure that the surfaces of the trenches, channels, or through-holes are substantially free from damage.

19. A method according to claim 17 including coating or filling the trenches, channels, or through-holes with the same conductive material used to define said electrodes at the surface of the substrate.

* * * * *